(12) United States Patent
Venkataraman et al.

(10) Patent No.: US 7,236,168 B2
(45) Date of Patent: Jun. 26, 2007

(54) METHOD FOR REMOVING BLENDS IN B-REP MODELS

(75) Inventors: Sashikumar Venkataraman, Bangalore (IN); Milind A. Sohoni, Mumbai (IN)

(73) Assignee: Geometric Software Solutions Co., Ltd., Bombay (IN)

( * ) Notice: Subject to any disclaimer, the term of this patent is extended or adjusted under 35 U.S.C. 154(b) by 356 days.

(21) Appl. No.: 10/866,134

(22) Filed: Jun. 14, 2004

(65) Prior Publication Data

US 2004/0257362 A1    Dec. 23, 2004

Related U.S. Application Data

(60) Provisional application No. 60/477,952, filed on Jun. 13, 2003.

(51) Int. Cl.
*G06T 15/00* (2006.01)
(52) U.S. Cl. .................. 345/420; 345/440; 345/619; 345/620
(58) Field of Classification Search ................ 345/420, 345/619, 620, 630, 440, 419
See application file for complete search history.

(56) References Cited

U.S. PATENT DOCUMENTS 6,760,038 B2 *  7/2004  Venkataraman et al. .... 345/620

6,995,762 B1 *  2/2006  Pavlidis et al. ............. 345/419

OTHER PUBLICATIONS

Venkataraman et al., Blend Recognition Algorithm and Applications, Solid Modeling, ACM, May 2001, pp. 99-108.*
Venkataraman et al., Removal of Blends from Boundary Representation Models, Solid Modeling, Jun. 2002, pp. 83-94.*

* cited by examiner

*Primary Examiner*—Phu K. Nguyen
(74) *Attorney, Agent, or Firm*—Stites & Harbison PLLC; Ross F. Hunt, Jr.

(57) ABSTRACT

A computer-based feature suppression method is used in removing a blend chain formed by a set of blend faces, and creating a new model without the blend faces. Blend recognition is used to determine the support faces, spring edges and cross edges for each blend face of the blend chain. The method further includes classifying the edges of the blend faces into spring edges, cross edges, and other edges, determining the other blend chains which interact with the blend chain of interest, separating the interacting blend chains from the blend chain, and deleting the blend face of the blend chain after separating thereof from the interacting blend chains. The cross edges of the blend faces in the blend chain are used to find the blend for which a face is missing between the blend face and the support face. In one implementation the identified blend chains are deleted by extension or contraction of neighboring blend faces so as to patch-up deleted regions.

18 Claims, 11 Drawing Sheets

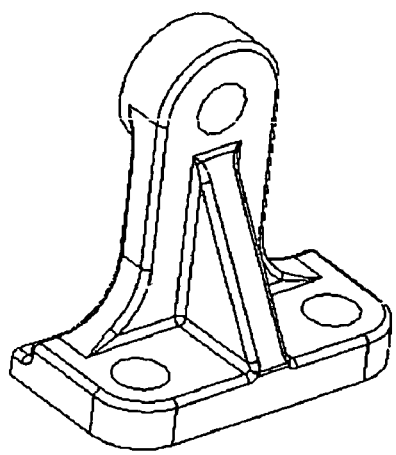
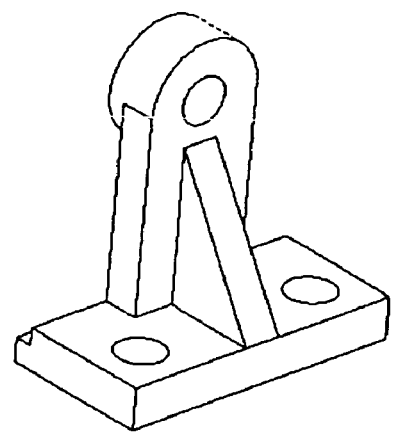
FIG. 1
FIG. 2
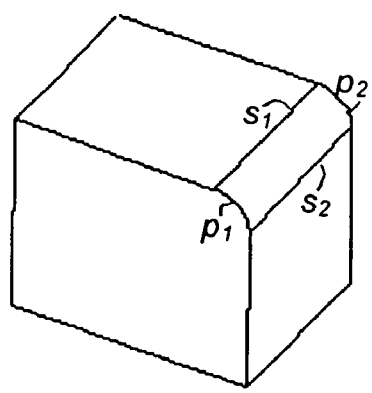
FIG. 3
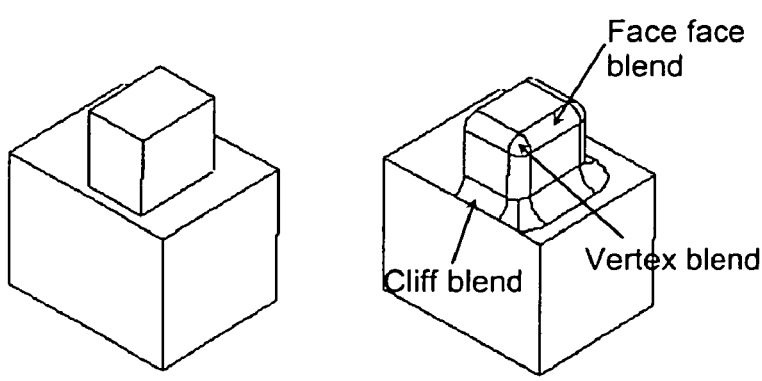
FIG. 4(a)
FIG. 4(b)

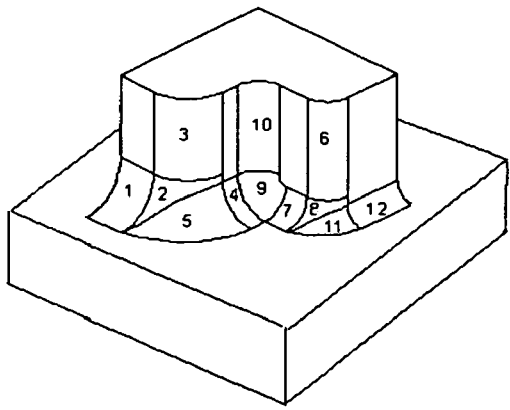
FIG. 11(a)
Chain 1:
    Fillet face 1
Chain 2:
    Fillet face 2
    Fillet face 3
Chain 3:
    Fillet face 4
    Fillet face 5
Chain 4:
    Fillet face 7
    Fillet face 9
    Fillet face 10
Chain 5:
    Fillet face 6
    Fillet face 8
Chain 6:
    Fillet face 11
    Fillet face 12
FIG. 11(b)
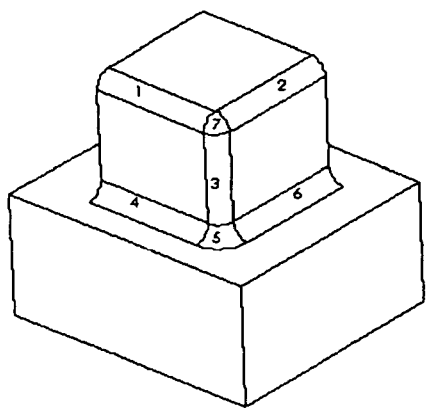
FIG. 12(a)
Chain 1:
    Leaf chain 1
        Fillet face 2
        Fillet face 7
    Leaf chain 2
        Fillet face 3
        Fillet face 7
    Leaf chain 3
        Fillet face 1
        Fillet face 7
Chain 2:
    Leaf chain 1
        Fillet face 4
        Fillet face 5
        Fillet face 6
FIG. 12(b)

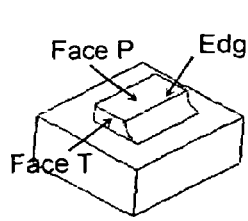 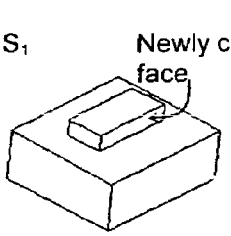 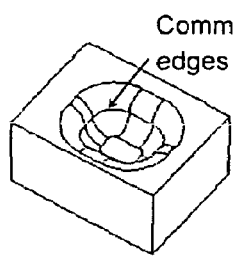 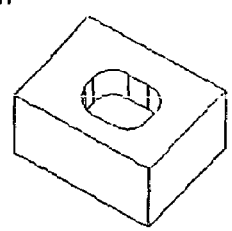
FIG. 19(a)  FIG. 19(b)  FIG. 20(a)  FIG. 20(b)
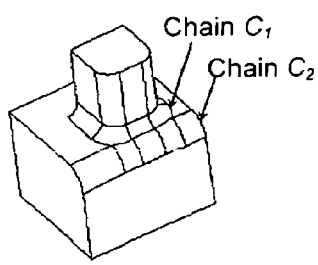 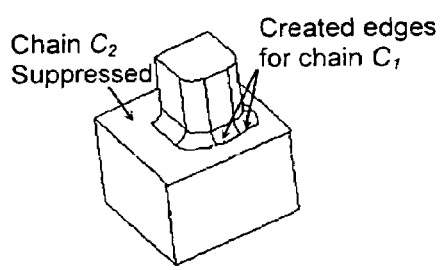
FIG. 21(a)  FIG. 21(b)
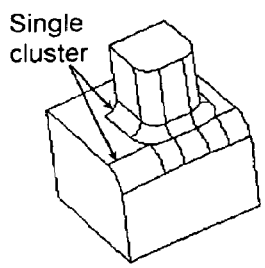 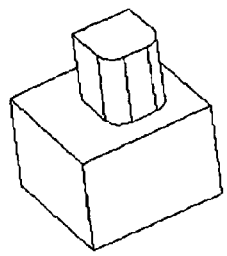
FIG. 22(a)  FIG. 22(b)

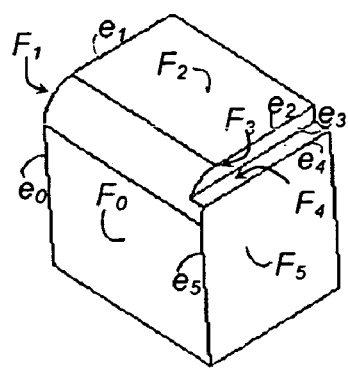
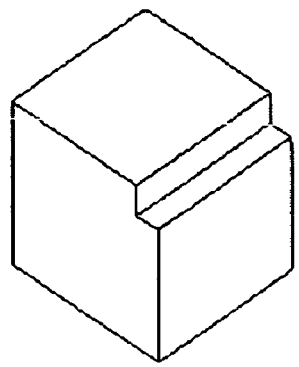
FIG. 23(a)  FIG. 23(b)
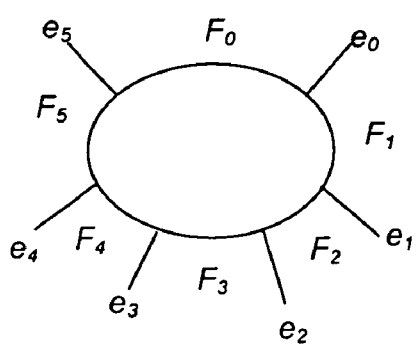
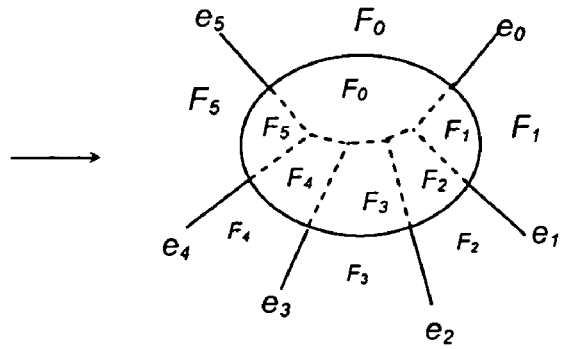
FIG. 24(a)  FIG. 24(b)
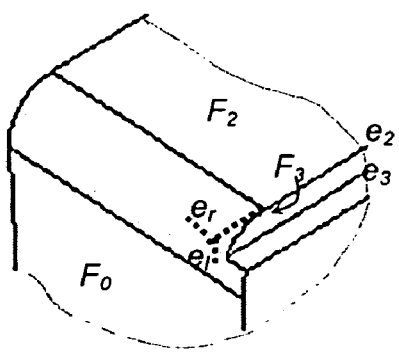
FIG. 25

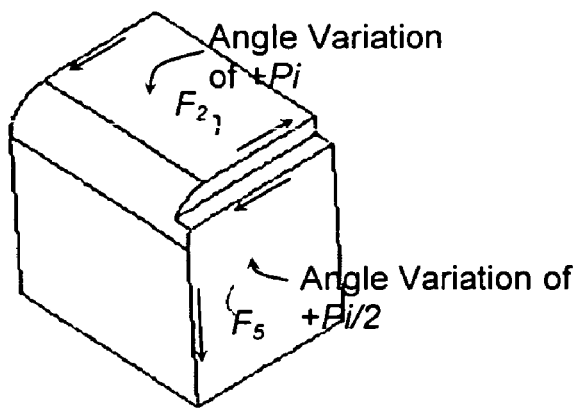
FIG. 28
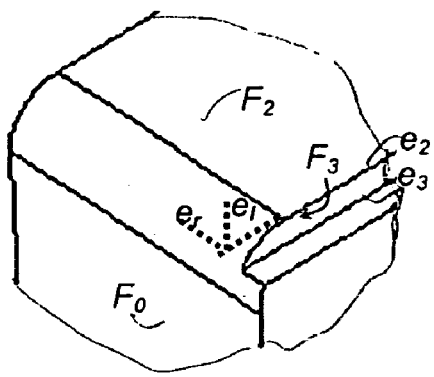
FIG. 29
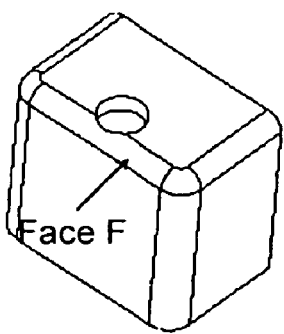 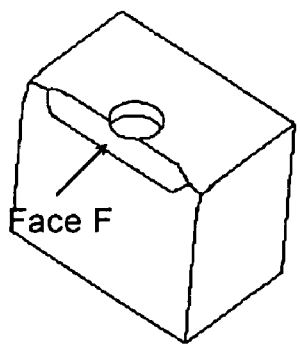 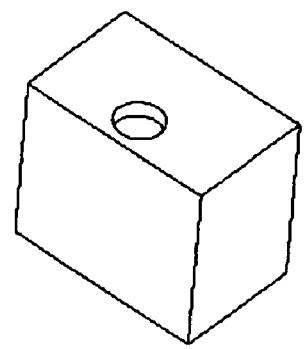
FIG. 30(a)  FIG. 30(b)  FIG. 30(c)

METHOD FOR REMOVING BLENDS IN B-REP MODELS

The present application is based on U.S. provisional application Ser. No. 60/477,952, filed Jun. 13, 2003. The present application further incorporates by reference the subject matter of commonly assigned, co-pending U.S. application Ser. No. 09/984,801, filed Oct. 30, 2001.

FIELD OF INVENTION

The invention relates generally to removal of certain features from three-dimensional solid or surface models, and more particularly, to a system and method for removal of blends from three-dimensional solid or surface models.

BACKGROUND OF THE INVENTION

Solid Modeling

Solid modeling is a term that refers to a set of techniques that can be used to create and store computer based representations of physical objects. A number of techniques have evolved over the years for providing computer-based representations of three-dimensional parts. One of these techniques is Boundary Representation, commonly referred to as B-rep.

A B-rep model of a mechanical part consists of a set of "faces," "edges" and "vertices," which are connected together to form a topological structure of the part. By using such a representation, it is possible to evaluate many properties of the part from its computer model. These include the mass, the volume, the moments of inertia and products of inertia. Additionally, such models enable computer-based analysis of stress and strains under different loading conditions.

A B-rep model representing a volume is termed as a solid model; a B-rep model comprising a collection of surfaces without enclosing a volume is termed as a surface or sheet model. In general, we refer a B-rep model as a model or a part.

Software based on solid modeling is widely used by engineers to create models of parts that are intended to eventually be manufactured. Software such as Solid-Works™ (SolidWorks Inc.), Pro/Engineer™ (Parametric Technology), I-DEAS™ (Structural Dynamics Research Corp.), Mechanical Desktop™ (AutoDesk) are examples of solid modeling software.

Overview of Blends

Blends are typically introduced into solid modeling to smoothen sharp edges and vertices in the part in order to improve their strength, to enhance the aesthetics thereof, and to ensure the manufacturability of the part. In this operation, called blending or filleting, new faces are introduced in place of the sharp edges and vertices to create smooth transitions from one surface to another. FIG. 1 shows an example of blending the part shown in FIG. 2.

Blends are of interest to engineers during all stages of the design-to-manufacturing cycle. While editing a part model, designers may be interested in modifying blend parameters such as the radius of the blend. In the analysis stage, an engineer may prefer to remove some blends since they are not expected to contribute significantly to stresses and strains in the part. For example, in Finite Element Analysis (FEA), removal of blends simplifies the part for mesh generation and analysis. Blend removal is also useful in recognition of features such as pockets and slots, as it is usually easier to recognize features in a model which does not contain blends. During manufacturing planning, the blend radii govern the selection of some of the manufacturing processes, the machine tools, the cutting tools and even the part stock itself.

The most common blend is the so-called face-face blend, which replaces a sharp edge by a face tangent to the two faces adjoining the sharp edge. The blend surface usually has a circular cross section, and the plane of the cross section is always perpendicular to both the adjoining faces. When three or more blended edges meet at a common vertex, a vertex blend is formed that connects all the neighboring blends smoothly. In simple blending, the geometry of a vertex blend is usually a sphere; however, in the general case, the geometry is described by an n-sided vertex blend surface. In special cases, blending can also take place between a face and an edge. Such blends are called face-edge blends or cliff blends, and may occur as boundary cases of face-face blends. FIG. 3 shows an example of a simple blend created by filleting one edge of a block while FIG. 4($b$) shows examples of various types of blends that appear during blending the simple part shown in FIG. 4($a$).

The blend geometry is computed using an imaginary rolling ball that maintains contact with the surfaces to be blended. The blend surface can be visualized as the envelope of this ball as it rolls along the edge. The locus of points traced by the rolling ball center is called the spine curve; the two edges of contact are called spring edges. The side faces neighboring the spring edges of the blend are called the support faces since they support the rolling ball. Thus, referring to FIG. 3, $s_1$ and $s_2$ indicate the spring edges of a blend. In FIG. 3, $p_1$ and $p_2$ indicate terminating edges as discussed below.

Blending may either add material to or remove material from a model, depending on the convexity characteristics of the blended edge. In this regard, a blend on a convex edge removes material from the model, while a blend on a concave edge adds material to the model.

Often during blending, a single blend operation generates many blend faces connected smoothly to each other. Such sets of blend faces created in a single blending operation are referred to as blend chains. The edges that connect adjacent blend faces present in a blend chain are called cross edges. Cross edges are usually generated when any of the adjoining support faces of the blend changes during blending. FIG. 6 shows an example of a convex blend formed by blending an edge of the model shown in FIG. 5. FIG. 7 shows an example of a concave blend chain formed by blending the three edges shown in FIG. 6, along with the two cross edges or cross curves that are present in the blend chain.

When a blend face in at the end of a blend chain, sharp edges are created. When the blend face terminates on a single face, a single sharp edge is created which is termed as an isolated terminating edge. In the example shown in FIG. 3, the blend chain has isolated terminating edges $p_1$ and $p_2$. When the blend face terminates in multiple faces, multiple sharp edges are formed. Sharp edges are also created due to interaction of blend with other features. Examples of such sharp edges are shown in FIGS. 10($a$) and 10($b$).

In many situations, blends created in different blending operations interact with each other forming a blend network. FIGS. 8($a$) to 8($g$) shows multiple blending operations forming a blend network.

Interacting Blends

Based on the nature of the support faces, blends are classified into several categories. When the support faces of the blend are same as the adjoining faces of the blended edge, the corresponding blend is termed as a normal blend. FIG. 3 shows an example of a normal blend. FIGS. 7 and 8 also show only normal blends in every step since the support faces of each blend face are the same as the adjoining faces of the blended edges.

In certain cases, the support face of the blend is not an adjoining face of the blended edge due to blend interactions. Example of such cases are shown in FIGS. 9(b), 9(d), 9(f) and 9(h). There are two common occurrences of blend interactions that will be considered below. In the first case, a blend chain interacts with another blend chain such that the support faces of a subset of blend faces in one chain are also blend faces belonging to another blend chain. Such interacting blend faces are termed blend on blend faces. The spring edges of the blend on blend faces are termed blend on blend edges. FIG. 9(b) shows the creation of a blend chain got by blending a single edge shown in FIG. 9(a). As indicated in FIG. 9(b), three of the blend faces shown are blend on blend faces, while the remaining two faces are normal blends.

In the second case, a portion of the blend chain rolls along an edge resulting in intermediate face-edge blends. These blends have a single support face on one side and an edge curve on the other side. These blends are termed as cliff blends and the corresponding edges that support the blends are termed as cliff edges. FIG. 9(d) shows cliff blends created by blending the edges shown in FIG. 9(c).

In certain situations, blend on blends and cliff blends can cause complete removal of a support face. FIG. 9(f) shows an example of a blend on blend that removes a support face of a neighboring blend during blending the edges shown in FIG. 9(e). FIG. 9(h) shows an example of a cliff blend that removes a face during blending the edge shown in FIG. 9(g).

Overview of Blend Recognition

Blend recognition is a necessary step required prior to blend removal. The current invention uses a blend recognition algorithm to generate information relating the underlying blend structure. One example of a blend recognition algorithm is described in the abovementioned U.S. application Ser. No. 09/984,801. Blend recognition is described in brief below.

The input to the blend recognizer is a B-Rep model. The output is a list of blend chains present in the model along with the corresponding blend parameters. The chains are also sequenced in an order that denotes a possible sequence that could have been used to create the blend network. The blend recognizer makes use of geometric clues to recognize and sequence the blends in the model.

FIGS. 11(a) and 119(b) show an example demonstrating the output of the blend recognizer for the blend network shown in FIG. 8(g). FIG. 11(a) is an enlarged version of FIG. 8(g) with the twelve fillet faces indicated by numerals 1 to 12. The recognized blends are chained and sequenced and are displayed alongside in FIG. 11(b). The blend recognizer recognizes six chains in this case; each chain corresponds exactly to the set of blends created in one intermediate step shown in FIGS. 8(a) to 8(g). The order of chains output also match the sequence in which they were created in the blend network.

In certain cases, it is possible for multiple sets of blend faces to be created either in the same or in different operations. In order to distinguish the two, the blend faces in a single blend chain are further classified into different leaf chains. Leaf chains represent minimal groups of blend faces that can be created in a single blending operation. Separate leaf chains in the same chain may or may not be created in a single blending operation. Leaf chains usually terminate at sharp edges or vertex blends, and blend chains are formed by grouping leaf chains across vertex blends. FIG. 12(a) shows the results of blends recognized on a simple model including seven fillet faces denoted 1 to 7. In this example, as shown in FIG. 12(b). Chain 1 consists of three leaf chains, each of which terminates on one side on vertex blend 7. Chain 2 consists of a single leaf chain that consists of faces 4,5 and 6. Again, the chain order denotes a possible sequence in which they were created originally in the model.

Euler Operations

The blend removal algorithm uses low-level topological operators, termed as Euler operators, to modify the local topology. A brief overview of Euler operators is given below.

Euler Operations are low-level topological functions that create/modify a small region of topology. Using these operators, topological elements such as faces, loops, edges and vertices may be added, removed, or modified in a model. It is know that the topology of any manifold B-rep model can be constructed using a sequence of Euler operators. Further, one can construct any valid model from any other valid B-rep topology by a finite sequence of these operators. Together with functions to attached and detach geometry, these functions enable applications to implement their own modeling operations.

Euler Operations always return a body with valid topological data-structures. However, the functions do not alter geometry, i.e., new or modified topology has no geometry attached. Geometry is later attached to the new or modified topology to make the model geometrically valid.

The Euler operators can be divided into two groups: the "make" group and the "kill" group. The make group consists of operators for adding some elements into the existing model, while the kill group does exactly the inverse of the make group. For example, MEV is an operator that makes an edge and a vertex, while KEV is an operator that kills (or deletes) and edge and vertex. Similarly, MEF is an Euler operator that makes an edge and face and KEF is the corresponding inverse operator. FIGS. 13(b) and 13(c) show examples of successively using two kill operators, KEV and KEF, respectively, to change the topology of the model shown in FIG. 13(a).

SUMMARY OF INVENTION

In accordance with the invention, there is provided a method implemented by a computer program, and a computer running the same, for removing a set of blend faces in solid or surface B-Rep models. The blends are assumed to have been prior recognized using a blend recognition algorithm. One example of a blend recognition algorithm that can be used is that described in the abovementioned U.S. application Ser. No. 09/984,801. The present invention advantageously comprises several software modules that, in a preferred embodiment, operate on B-rep solid models. The modules may be implemented in any computer programming language, such as C or C++, and may use local operators from known geometric modeling kernels According to one aspect of the present invention, there is provided a method for blend removal that receives a B-rep model from, for example, one of the solid modeling programs mentioned earlier or from any other source capable of providing a standardized B-rep data structure for describing three-dimensional model.

According to another aspect of the present invention, a blend recognition algorithm is run prior to blend removal to recognize blends in the model, wherein the said blend recognition algorithm returns a set of blend chains in a sequence in which they were possibly created in the model.

According to another aspect of the present invention, the blend removal algorithm operates on a set of blend chains and removes the blend chains in a sequence reverse to the one in which they possibly were created, thus ensuring valid intermediate models after suppressing each blend chain.

According to another aspect of the present invention, the blend removal algorithm, while predicting the final topology, uses, as an aid, the underlying blend structure as determined during blend recognition, with minimal or no heuristics, thus decreasing the number of geometric computations such as curve-surface and surface-surface intersections, and also making blend deletion more predictable.

According to another aspect of the present invention there is provided a method for face deletion for use in determining the final topology, when the topology cannot be predicted solely based on the underlying blend structure, wherein the face deletion algorithm proceeds by extension or contraction of the neighbor faces to patch up the deleted region, and uses geometric techniques to determine the topological connectivity relationships between the faces neighboring the deleted region.

According to another aspect of the present invention there is provided as method for recreating new or missing faces in certain situations, such as, for example, when the blending operation results in complete loss of some neighbor or support faces which, therefore, need to be recreated during the suppression of the corresponding blends.

Further features and advantages of the present invention will be set forth in, or apparent from, the detailed description of preferred embodiments thereof which follows.

BRIEF DESCRIPTION OF THE DRAWINGS

FIG. 1 shows a solid model having fillets or blend faces on the edges.

FIG. 2 shows the same solid model part in FIG. 1 wherein the blend faces are removed.

FIG. 3 shows are simple model with a single blend face.

FIG. 4(b) shows examples of face-face, face-edge and vertex blends, formed by blending a subset of the edges of the part shown in FIG. 4(a).

FIGS. 9(a), 9(c), 9(e) and 9(g) show examples parts with blend edges indicated while

FIGS. 11(a) and 11(b) show a part and the results of the blend recognizer on the part, the part corresponding that is shown in FIG. 8(g).

FIGS. 12(a) and 12(b) show a further part and the results of the blend recognizer on the further part.

FIGS. 19(a) and 19(b) show the formation of the missing support face for a cliff blend during blend removal.

FIGS. 20(a) and 20(b) show blend removal for a blend chain with all support faces on one side missing.

FIGS. 21(a) and 21(b) show the creation of smooth edges obtained during removal of a blend on blend.

FIGS. 22(a) and 22(b) show the removal of the complete cluster consisting of both the chains in FIG. 21(a) in one step.

FIGS. 23(a) and 23(b) show the suppression of a blend that has interacting features using a face deletion algorithm in accordance with one aspect of the invention.

FIG. 24(a) shows a loop problem and FIG. 24(b) shows the solution graph obtained for the loop problem of FIG. 24(a)using STET face deletion algorithm.

FIG. 25 shows one step of STET face deletion algorithm involving starting from an initial external edge, finding of an opposite face, and creating two new edges.

FIG. 28 shows a part demonstrating the angle variation for two external faces.

FIG. 29 shows a part demonstrating one of the newly created edges for a face deletion step carried out in the wrong direction.

FIGS. 30(a) to 30(c) show the localizing of feature interactions during blend removal.

DETAILED DESCRIPTION OF THE PREFERRED EMBODIMENTS

Figure 5:
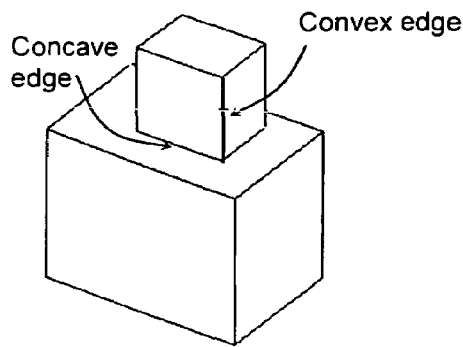
FIG. 5 shows a part with one edge highlighted.
Figure 6:
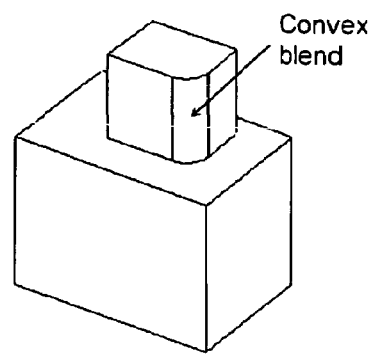
FIG. 6 shows a part obtained after blending an edge of the part shown in FIG. 5.

A method will now be discussed for removing a set of blend chains from a part.

Before presenting the complete blend removal algorithm, the operation of the algorithm on the simple example shown in FIG. 3 will first be considered. The blend recognition algorithm is first used to detect the blend chain consisting of a single blend face. The blend recognizer also classifies edges $s_1$ and $s_2$ as spring edges of the blend face while the edges $p_1$ and $p_2$ are classified as the isolated terminating sharp edges of the blend.

The blend chain along with the edge classification is then passed to the blend suppressor for removal. The blend removal algorithm analyzes the edges of the blend faces, and arrives at a sequence of operations to modify the topology. In the example above, the sequence consists of the following two steps, and a final step for computing geometry.

Step 1: Collapse the sharp edges $p_1$ and $p_2$ into vertices. After this step, the topology of the blend face is as shown in FIG. 13(c).

Step 2: The blend face, now consisting of two edges, is collapsed into a single edge. The final topology of the model is shown in FIG. 13(c).

Step 3: After fixing the topology, the geometry of the edge and vertices are calculated. The edge geometry is found by extending an intersecting the two support faces of the blend face. The geometry of the end vertices is then computed by extension and intersection of the created edge curve and the neighboring surfaces.

The above technique can be used to directly remove blend chains that consist of normal blends with isolated terminating edges. In presence of common blend on blend interactions, a set of rules is used for predicting the final topology.

In certain specific situations of blend interactions, missing support faces are also recovered during the blend removal algorithm. The detailed algorithm is set forth below.

Procedure DeleteBlends (Chain C: faces $f_1, f_2, f_3, \ldots$)
Input: A B-rep model and a blend chain C
Output: Modified model with the blend chain suppressed.
Step 1: Perform initial analysis. Classify blend faces and edges.
Step 2: Predict Topology.
(2.1) Resolve blend-blend interactions.
  Separate blends from neighboring blend chains.
  Recreate new support faces if necessary.
(2.2) Delete blend faces as normal blends.
  Collapse cross edges and isolated terminating edges into vertices.
  Collapse each face that consists of two spring edges into an edge.
Step 3: Compute Geometry for created edges and vertices.
Step 4: Resolve sharp edges and other feature interactions.
Step 5: Perform final check. If check fails, restore back original model.
End DeleteBlend Having set forth the blend removal algorithm in broad terms, the individual steps of the algorithm will be considered in detail.

Step 1: Initial Analysis

In the first step, an analysis of the whole blend chain is performed to classify the blends on the basis of the support faces. This principally involves processing the results of the blend recognition algorithm. Spring and cross edges are directly output from the blend recognizer.

Blend on blends are detected as blends whose support faces are also blends and the across curvature on either side of the shared spring edge correspond to the respective blend curvatures, while cliff blends are detected as blends having a single spring edge.

Step 2: Topology Prediction

Figure 7:
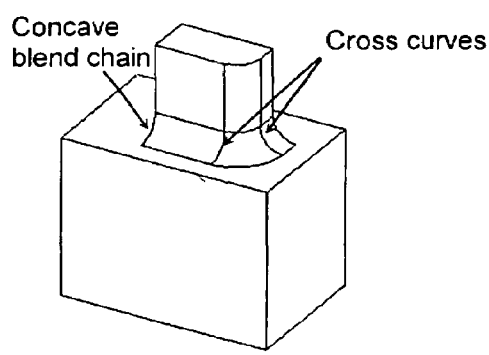
FIG. 7 shows a part obtained after blending three edges of the part shown in FIG. 6.
Figure 8A:
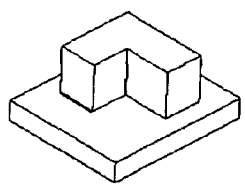
FIGS. 8(a) to 8(g) show successive blending operations on a par in forming a blend network.
Figure 8B:
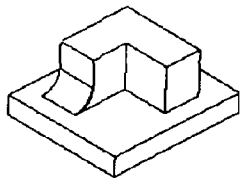
Figure 8C:
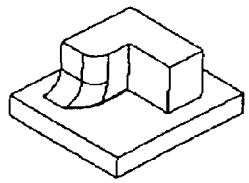
Figure 8D:
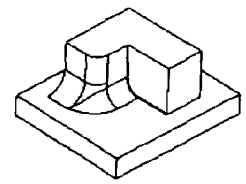
Figure 8G:
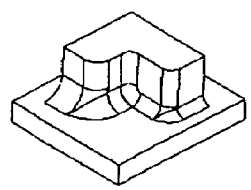
Figure 8F:
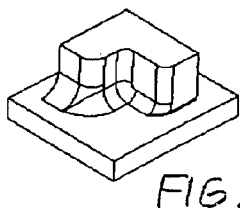
Figure 8E:
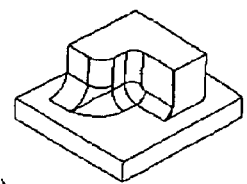
Figure 14A:
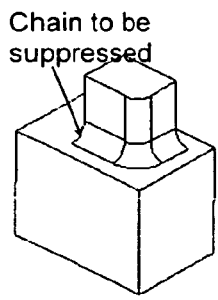
FIGS. 14(a) to 14(c) show successive operations involved during blend removal of the concave blend chain shown in FIG. 7.
Figure 14B:
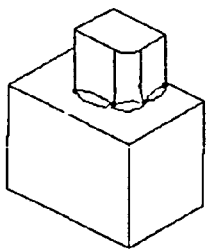
Figure 14C:
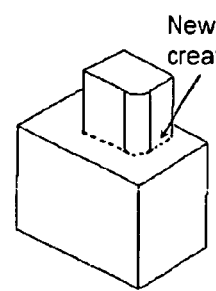

In this step, the final topology is predicted wherever possible using the classification of blend edges and faces done in the analysis step. The final topology is then achieved using a sequence of Euler operators It was shown above how the prediction of topology works for simple blend without any feature interactions. FIGS. 14(a) to 14(c) show the successive changes in topology for the concave blend chain shown in FIG. 7. The Euler operator KEV is first used to delete the cross edges and isolated terminating edges of the blend faces as shown in FIG. 14(b). The blend faces are then collapsed into an edge using the KEF operator as shown in FIG. 14(c). The dotted edges in FIG. 14(c) show the newly created edges created during blend removal.

In addition to normal blends described above, the blend removal algorithm also resolves the final topology for certain blend interactions. The blend removal algorithm resolves two kinds of blend interactions deterministically, namely, certain classes of blend on blends and cliff blends.

Figure 15A:
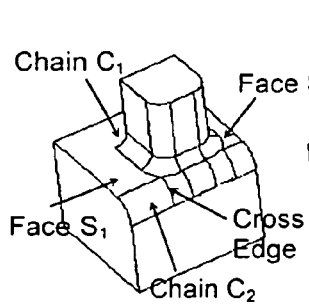
FIG. 15(a) shows a part and FIG. 15(b) shows the separation of blend on blends during blend removal on the part shown in FIG. 15(a).
Figure 15B:
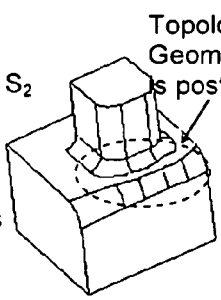

Blend on blends are resolved by topologically separating the blend chain from neighboring blends as shown in FIG. 15(b). The vertex to begin the split on blend of blends is determined using the clue of the cross edge as shown in the FIG. 15(a). A check is performed to verify if the common support face adjoining the vertex at the start of the blend on blend (namely face $S_1$) is the same as, or co-defined with, the common support face near the vertex at the end of the blend on blend (namely face $S_2$). In the example shown in FIG. 15(a), the two support faces, $S_1$ and $S_2$, are the same, and hence the blend on blends can be completely separated by merging the two sides of the face creating a new loop.

In support faces ($S_1$ and $S_2$) are not the same or co-defined, then either there is an edge between the two support faces, or there are new faces that need to be recreated between the two support faces In such cases, the cross edges in the region provide valuable clues for the missing faces. This step is discussed below in more detail.

Figure 16A:
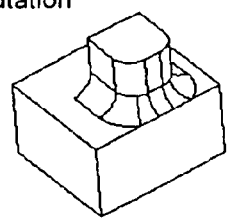
FIG. 16(a) shows a part and FIG. 16(b) shows the separation of cliff blends during blend removal on the part shown in FIG.16(a).
Figure 16B:
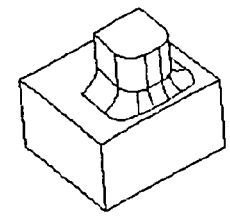

Cliff blends are also separated in a similar manner. An example of this is shown in FIG. 16(b). The start of the cliff is determined using the transition from a normal blend to a cliff blend, as shown in FIG. 16(a).

The above blend separation is also achieved using a sequence of Euler operators. After separation of the blend on blends and cliff blends, the individual blend faces are removed in a manner similar to normal blends using the aforementioned KEV and KEF operators.

Figure 31A:
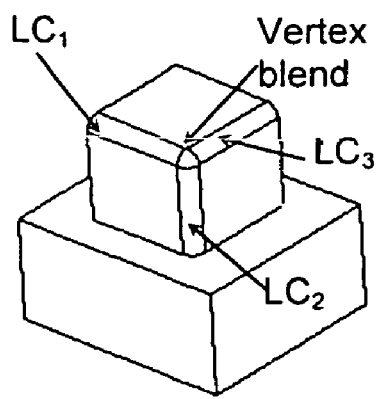
FIGS. 31(a) and 31(b) show the removal of a vertex blend.
Figure 31B:
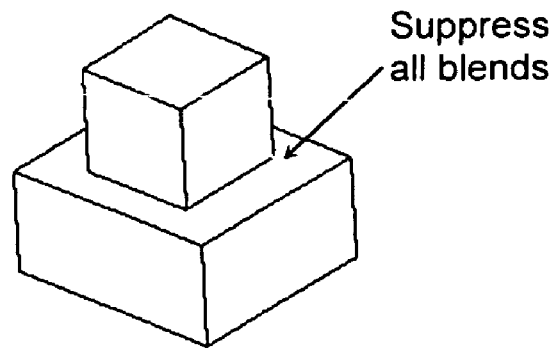

The blend removal algorithm also handles vertex blends similarly. In removing a vertex blend, all the blend chains around the vertex blend are passed for deletion. In this case, all the cross edges collapse to vertices, and the vertex blend collapses into a single vertex. FIG. 31(b) shows the collapsing of a vertex blend during the suppression of a chain consisting of three leaf chains, as shown in FIG. 31(a).

Recreating Faces

Figure 9A:
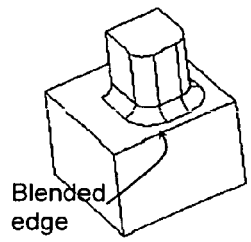
Figure 9B:
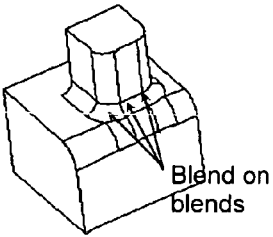
FIGS. 9(b), 9(d), 9(f) and 9(h) show respectively the same parts in FIGS. 9(a), 9(c), 9(e) and 9(g), after blending the indicated blend edges.
Figure 9C:
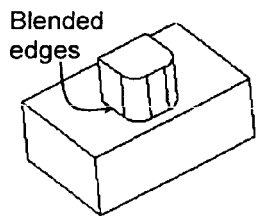
Figure 9D:
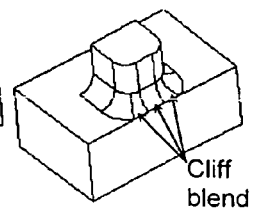
Figure 9E:
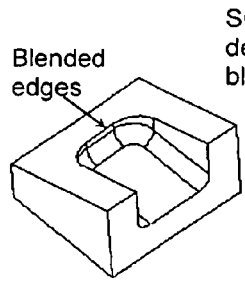
Figure 9F:
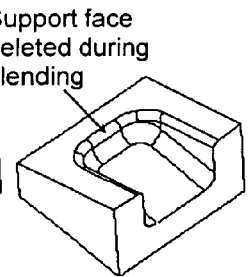
Figure 9G:
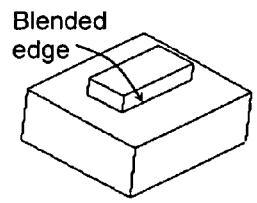
Figure 9H:
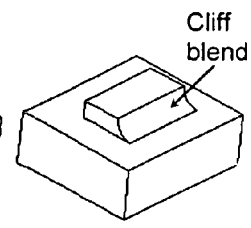
Figure 10A:
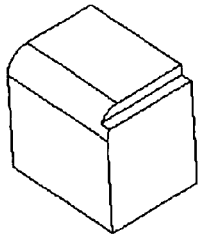
FIGS. 10(a) and 10(b) show examples of blends interacting with other features.
Figure 10B:
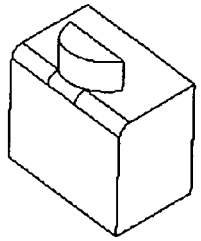

In certain situations, blend on blends and cliff blends can cause complete removal of the support or neighboring faces. FIG. 9(f) shows an example of a blend on blend that removes a support face of the neighboring blend, as shown in FIG. 9(e). Suppression of the top chain must hence be accompanied by the creation of the removed face. In general, it is difficult to predict the faces that need to be recreated during blend suppression. However, in many situations, local clues aid in predicting the new faces. The method is explained in more detail below.

Figure 17:
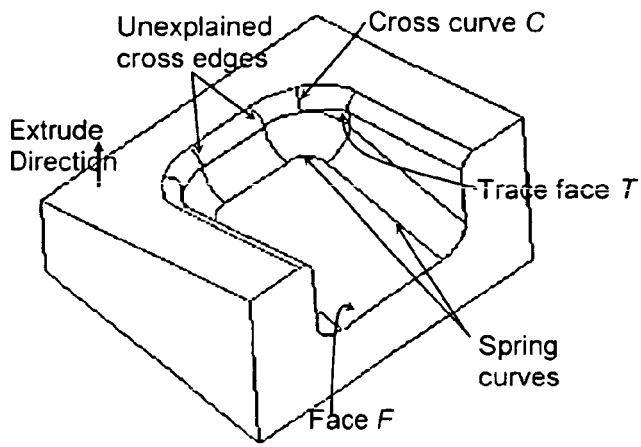
FIG. 17 shows an enlarged view of the part containing a blend on blend as shown in FIG.9(f) in which a support is removed during blending.
Figure 18A:
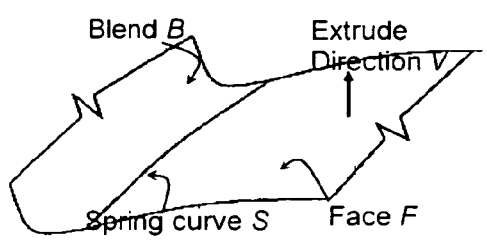
FIGS. 18(a) to (d) show successive steps in the formation of the missing support face for a blend on blend during blend removal.
Figure 18B:
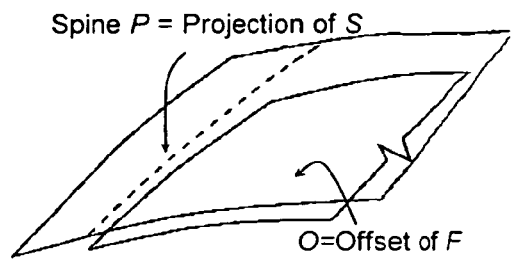
Figure 18C:
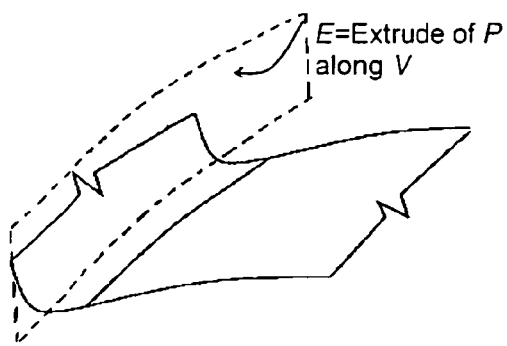
Figure 18D:
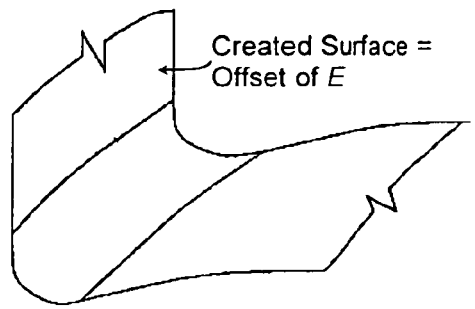

In FIG. 17, is an enlarged view of the blend on blend shown in FIG. 9(f), the bottom and top chains are first recognized by the blend recognizer. The cross edge or cross curve C provides the clue that the top chain was introduced later, and hence should be suppressed first. Two cross edges of the bottom chain are not explained by any of the adjoining faces. This indicates that one face was removed when the top chain was introduced, and hence need to be recreated during suppression. Further, faces adjoining the missing faces are determined by analyzing the junction between the two chains. These faces are referred to as trace faces. As shown in FIG. 17. face T is one of the trace faces. A similar trace face is present in the other end of the blend chain.

The central idea in face recreation is that in certain situations the spring curves on one side of the blend and the trace faces are sufficient to predict precisely the surfaces on the other side. In the example above, both the trace faces are found to be extrude surface in the same direction. Hence, the missing face is also concluded to be an extrude surface, and part of the same extrude feature. The exact geometry of the missing face can then be computed systematically by using the spring curves on the other side of the blend as explained below.

Let r be the blend radius of the bottom chain. The following steps are carried out for each of the spring edge between the unexplained cross edges in the bottom chain to recreate the corresponding missing faces. These steps are shown pictorially in FIGS. 18(a) to 18(d) and are listed below.

Step 1: Offset the bottom support face F by r to create surface O.

Step 2: Project spring edge S of the bottom chain to the offset surface O to create the spine P of the bottom chain.

Step 3: Sweep the spine P in the extrude direction to create the extrude surfaces E. Note that P, in general, in to a planar curve.

Step 4: Offset E by r to create the missing face.

The above analysis is specific for recreating missing faces that are part of an extrude feature. A similar analysis also holds when trace faces are found to be revolve surfaces about the same axis, and the missing faces are concluded to be a part of the corresponding revolve feature. In general, the above paradigm can be extended to recreate missing surfaces that arise from a sketch-based operation such as a extrude/revolve/sweep/loft operation.

However, in other situation no clue faces may be present and the missing faces cannot be recreated unambiguously. FIGS. 19(a) and 20(a) show examples of blends in which no clue face exists. In such cases, certain heuristics are used for recreating the missing face and finding one possible solution. In FIG. 19(a), the face T is used as a clue face, and the geometry of the missing support face is found by sweeping the sharp edge $S_1$ along the normal of the planar face P. In FIG. 20, the missing faces are recreated by extruding the common edges between the two blends perpendicular to the plane containing the edges. In such cases, the normal of the blends along with the common edges give clues relating to the draft angle of the missing faces.

Step 3: Geometry Computations

After topology modification, the geometry is computed for all the topological entities created in the previous steps. For newly created faces, the geometry creation is based on the neighboring clue faces as discussed above. The issues involved in determining the geometry of the newly created edges and vertices will now be discussed.

Figure 13A:
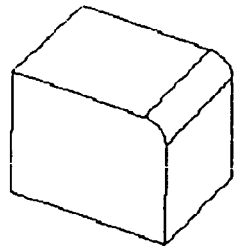
FIGS. 13(a) to 13(c) show successive topological operations involved during blend removal of the simple blend shown in FIG. 3.
Figure 13B:
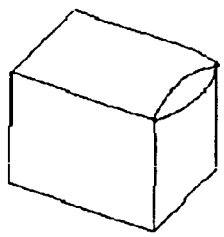
Figure 13C:
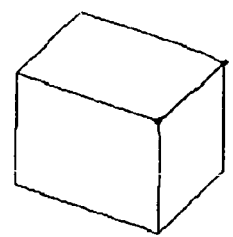

For normal blends such as the examples shown in FIGS. 13(a) and 14(a), new edges are created between the adjoining support faces of the blend as shown in FIGS. 13(c) and 14(c). The geometry of these edges is computed by extending and intersecting the geometry of the adjoining support surfaces. The geometry of the created vertices is then computed by extending and intersecting the external edge at the created vertex with the face touching the edge at the vertex. In FIG. 14(c) for example, the geometry of the vertices is obtained by intersecting the vertical edges with the horizontal planar face.

In case of normal blends, the above method always gives rise to sharp intersections. However, for interacting blend cases such as blend on blends, removal of a single chain may result in a smooth intersection. For example, FIG. 21(b) shows the removal of chain $C_2$ from the part shown in FIG. 21(a). Using the above strategy, the geometry of the created edges would need to be found by intersection of the neighboring blend with the support face. This results in smooth intersections, and is hence prone to failure.

The problem can be simplified if we remove all the interacting blends from the model in a single step. The geometry computations associated with the intermediate created edges is postponed till the final topology is determined for all the blend chains in the blend network. This grouping of interacting blend chains is termed as blend clustering. Apart from increasing speed, blend clustering avoids smooth intersections, which would otherwise be necessary if a single chain is removed.

FIG. 22(b) shows the result of the deletion of both the blend chains $C_1$ and $C_2$ as a single blend cluster from the part shown in FIG. 22(a). Chain $C_1$ is deleted immediately after chain $C_2$ without computing the geometry of the intermediate created edges.

Step 4: Resolving Other Feature Interactions

In the steps mentioned above, the blend removal algorithm directly predicts the final topology along with the geometry based on the underlying blend structure.

However, in certain situations such as in FIG. 23(a) wherein blends interact with other features along sharp edges, the final topology cannot be predicted by only using the blend topology. In such cases, the blend suppressor calls up or otherwise uses a face-deletion algorithm to determine the final topology around the deleted region. The details of the face-deletion algorithm are described below.

The face deletion algorithm takes in a set of connected faces to be deleted. These faces are termed as the feature faces. The output is modified model obtained by removing the set of faces, and "patching up" or filling in the deleted region by extension/contraction of neighboring faces. The neighboring faces are also termed as the external faces and are denoted $F_0, F_1, F_2, \ldots F_n$, with faces $F_0$ to $F_5$ being shown in FIG. 23(a).

The edges that are along the boundary of the feature faces are termed as boundary edges, and the vertices along the boundary are termed as the boundary vertices. The set of boundary edges forms one or more boundary loops. The edges that are not along the boundary but touch the boundary vertices are termed external edges. These edges are denoted $e_0, e_1, e_2, \ldots e_n$, with edges $e_0$ to $e_5$ being shown in FIG. 23(a).

The set of boundary edges along with the external edges and external faces, form a loop problem. The loop problem is a planar graph and is shown pictorially in FIG. 24(a). The face deletion algorithm proceeds by extension or contraction of the external faces around the boundary loop and patching up the deleted region. The final topology formed by the face deletion algorithm is termed as the solution graph and is shown in FIG. 24(b).

The delete face algorithm begins by selecting an external edge, and extending the underlying curve to an appropriate interval around the boundary vertex of the edge. A face is determined from the set of external faces that most likely intersects this external edge. This face is termed as the opposite face. The end vertex of the extended external edge $v_c$, is determined as the intersection of the external edge and the opposite face. This simultaneously creates two edges of the solution graph emanating from $v_c$, that are obtained by intersection of the corresponding adjacent faces of the external edge and the opposite face.

FIG. 25 shows this step starting at the external edge $e_2$. The opposite face is determined as face $F_0$. The edges $e_r$ and $e_l$ are determined as the intersection of faces $F_2$ and $F_3$ with face $F_0$.

Figure 26:
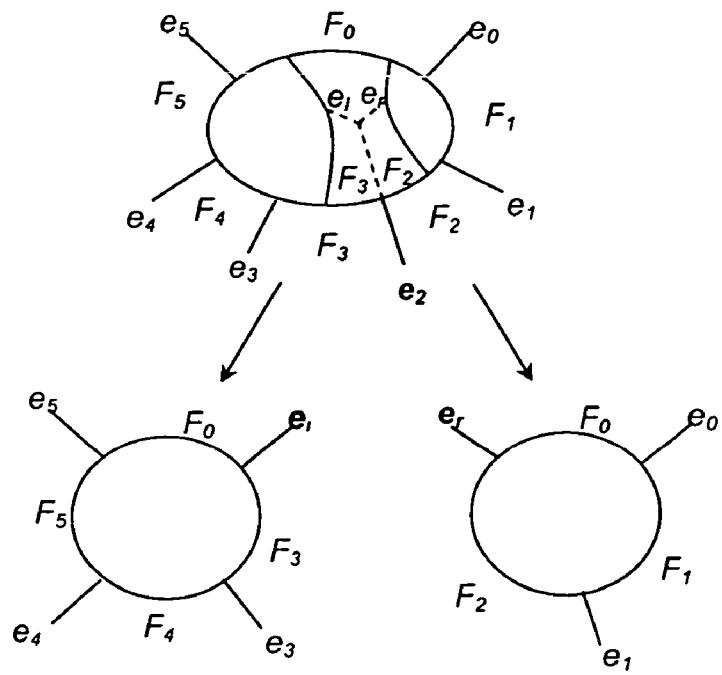
FIG. 26 shows the breaking of the sub-problem into two sub-problems with smaller number of external edges in each sub-problem.

The above step naturally breaks the delete face problem into two sub-problems corresponding to the external edges on either side of the selected external edge. In the above example $e_1, e_3, e_4$ and $e_5$ form one loop problem, while $e_r$, $e_0$ and $e_1$ form another loop problem. These problems are recursively solved as individual loop problems. The sub-graphs obtained by the sub-problems are then combined to produce the final solution graph. FIG. 26 shows, schematically, the breaking of the loop problem into two sub-problems.

Figure 27:
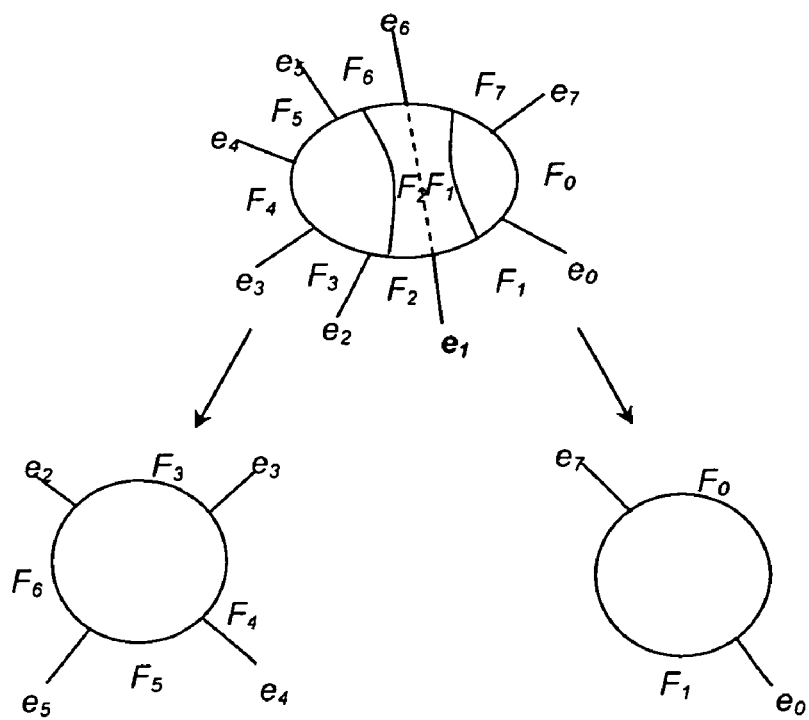
FIG. 27 shows the breaking of the delete face problem when an opposite co-defined external edge is found instead of an opposite face.

In certain situations, instead of an opposite face, an opposite external edge is found whose adjacent faces have the same geometry as the selected external edge. Such edges are termed as co-defined edges. In this case, the extended external edge merges with the opposite external edge, and no new edges are created. The loop problem in this case also splits into two sub-problems that correspond to the external edges on either side of the selected external edge. This is shown pictorially in FIG. 27 for a different input to the delete face algorithm.

The over all face deletion algorithm is set forth below.
Procedure: DeleteFace ($e_0, e_1, \ldots e_n$: circular list)
Input: A set of circularly ordered external edges.
Output: Inner solution graph corresponding to the boundary loop.

Step 1: Pick an external edge $e_i$ from the loop with boundary vertex $v_i$, left face $F_l$ and right face $F_r$.

Step 2: Find opposite face $F_c$ or co-defined edge $e_c$ using heuristics. If not opposite face or edge found, then quit.

Step 3: If not opposite face found, do
(3.1) Create vertex $v_c$ on $F_c$ and an edge $e_i$ between $v_c$ and $v_i$. Create edge $e_l$ between $F_l$ and $F_c$ and edge $e_r$ between $F_r$ and $F_c$.
(3.2) DeleteFace ($e_1, e_{i+1}, \ldots e_{c-1}$)
(3.3) DeleteFace ($e_r, e_{c+1}, \ldots e_{i-1}$)

Step 4: If co-defined edge found, do
(4.1) Create edge between $e_i$ and $e_c$.
(4.2) DeleteFace ($e_{i+1}, e_{i+2}, \ldots e_{c-1}$).
(4.3) DeleteFace ($e_{c+1}, e_{c+2}, \ldots e_{i-1}$).

End DeleteFace

The above recursion continues until the sub-problems are reduced to the terminating steps of the recursion, that is, a problem containing no external edges, which is trivially solved since it does not affect the final solution graph.

There are two important heuristics in each step of the above recursion. The first heuristic is finding the opposite face for the external edge. One simple heuristic is to pick the face whose underlying surface is closest to the external vertex $v_i$ along $e_i$. This is found by intersecting the extended curve of ei and the geometry of all the external faces, and finding the face that first intersects the extended external edge starting from the boundary vertex.

The second important heuristic in each step of the recursion is determination of the convexity of the newly created edges, $e_l$ and $e_r$. The convexity of an edge is also directly related to the direction of the edge curve. FIG. 25 shows the right directions for the edges $e_l$ and $e_r$. FIG. 29 shows the wrong direction for edges $e_l$ and $e_r$.

One heuristic for determining the convexity of the newly created edges uses the external edges of the neighboring faces. Every neighbor face typically has two external edges. The angle between these two external edges is termed the external angle for the face. The angle denotes the total of the signed angle turn as one traverses from one external edge to the other along the solution graph. This quantity is independent of the nature of the solution graph and thus may be computed beforehand. FIG. 28 shows the external angle for faces $F_0, F_1$ and $F_2$. The external angle for face $F_2$ is Pi, while the external angle for $F_5$ is Pi/2.

The total of the absolute value of the angle turn for each face, however, depends on the solution graph, and is equal to, or more than, the external angle. This is referred to as the absolute external angle. The heuristic used to assign the direction of edges aims to minimize the sum of the absolute external angles of the neighbor faces.

Using this heuristic, the angle variation for the edge directions shown in FIG. 29 result in more variation than those shown in FIG. 25. This is because in FIG. 29, the variation for face $F_3$ becomes large due to the wrong direction set for edge $e_l$ since $e_l$ will have to turn at least 3*Pi/2 more to depart along $F_3$ ad $e_3$.

If the heuristics fail at any step, then a wrong solution or no solution is obtained. A potentially wrong solution is determined by performing a validity check on the final topological and geometry structure. If the check fails, the model is reverted back to the original state.

In order to avoid overall failure due to the failure of a particular heuristic, backtracking is used in the delete face algorithm to try all possible opposite faces and edge convexities. This involves undoing the loop problem which consists of deleting the newly created edges, vertices and faces formed during solving of the loop problem, so as to try another possible solution graph for the loop problem.

Resolving Complex Feature Interations

Frequently, one encounters a large blend chain that contains small regions of sharp edges due to feature interactions such as in FIG. 30(a). One method to delete the blend chain is to pass all the faces of the chain to the geometric face-deletion algorithm. However, the operation can be made more reliable by localizing the geometric approach to the vicinity of the interacting region. The remaining region is resolved using steps (2) and (3) of the blend removal algorithm by predicting the topology directly. For example, in FIG. 30(b), only a single blend face is passed to the face deletion algorithm, the rest having been deleted using the steps (2) and (3) of the blend removal algorithm.

Step 5: Final Check

In the last step, a final check is performed locally after blend removal to validate the topology and geometry constructed by the algorithm. If the check fails, or if any of the intermediate steps (such as a specific geometry computation) failed, all the operations are undone, and the model is restored back to the original state.

Although the invention has been described above in relation to preferred embodiments thereof, it will be understood by those skilled in the art that variations and modifications can be effected in these preferred embodiments without departing from the scope and spirit of the invention.

What is claimed:

1. A computer-based feature suppression method for removing blend chains from a three-dimensional B-rep model, wherein the said B-rep model contains a plurality of blend chains, and wherein each of the said blend chains comprises of a plurality of blend faces, and for creating a further model without the blend chains that are removed, said method comprising the steps of:

using a blend recognition algorithm to identify a plurality of blend chains in a given B-rep model to produce a plurality of identified blend chains;

determining a subset of said identified blend chains interacting with each of said identified blend chains so as to produce a subset of interacting blend chains;

separating the interacting blend chains from said identified blend chains so as to produce identified and separated blend chains; and deleting each blend face present in each of said identified and separated blend chains.

2. A method for removing blend chains as claimed in claim 1, wherein the step of determining a subset of blend chains interacting with each of said identified blend chain comprises, for each identified blend chain, using a subset of the cross edges of the blend faces in the identified blend chain to identify a subset of the blend faces for which one of the support faces is also a blend face present in a separate blend chain, said support faces comprising all faces neighboring the identified blend face.

3. A method for removing blend chains as claimed in claim 1, wherein the step of separating the interacting blend chains from said identified blend chains comprises, for each identified blend chain, recreating missing faces between the identified blend chain and the interacting blend chains, and forming a plurality of new adjacent faces for a subset of the blend faces present in the identified blend chain and the interacting blend chains.

4. A method for removing blend chains as claimed in claim 3, wherein the step of recreating missing faces further comprises, for each identified blend chain, using a subset of cross edges from a subset of the blend faces present in the identified blend chain to determine whether said missing faces are neighboring faces of the subset of blend faces present in the identified blend chain.

5. A method for removing blend chains as claimed in claim 4, further comprising recreating a plurality of missing faces by extending the neighboring faces, said neighboring faces comprising a subset of faces neighboring the blend faces present in the identified blend chain and the interacting blend chain.

6. A method for removing blend chains as claimed in claim 4, further comprising recreating a plurality of missing faces determined as extrude surfaces, in a case where the missing faces cannot be determined by extending the neighboring faces, wherein said neighboring faces comprise a subset of faces neighboring the blend faces present in the identified blend chain and the interacting blend chain.

7. A method for removing blend chains as claimed in claim 1, wherein the step of deleting such blend faces present in each of the identified blend chains comprises, for each identified blend chain, using adjacent faces of the identified blend chain, wherein the adjacent faces comprise a subset of faces neighboring the blend faces present in the identified blend chain, and extending and intersecting the subset of adjacent faces to create new edges and new vertices.

8. A method for removing blend chains as-claimed in claim 7, further comprising using clues provided by the adjacent faces of the identified blend chain to aid in determining the new edges and the new vertices.

9. A method for removing blend claims as claimed in claim 7, further comprising grouping the interacting blend chains into a single cluster so as to avoid smooth intersections during the deleting step.

10. A method for removing blend chains as claimed in claim 1, further comprising removing the identified blend chains in a sequence which is the reverse of a probable blend chain sequence in which the blend chains were created, and wherein the probable blend chain sequence is obtained from a blend recognition algorithm.

11. A computer readable medium comprising computer-readable instructions which, when executed using a computer, perform the steps of claim 1.

12. A computer-based method for removing blend chains present in a three-dimensional B-rep model, wherein the said B-rep model contains a plurality of blend chains, wherein each of the blend chains comprises of a plurality of blend faces, and creating a new or modified model without the said blend chains and blend faces, said method comprising:
    using a blend recognition algorithm to identify a plurality of blend chains in a B-rep model so as to produce a plurality of identified blend chains; and
    deleting the identified blend chains by extension or contraction of faces neighboring the blend faces of the identified blend chains so as to patch up the deleted regions.

13. A method for removing blend chains as claimed in claim 12, wherein said deletion of said identified blend chains further comprises forming a plurality of loop problems for a subset of said blend faces present in said identified blend chains, wherein each said loop problem comprises a set of boundary edges, external edges and external faces, and solving each said loop problem to obtain the solution graph that determines a resultant model topology and geometry after removal of the subset of blend faces.

14. A method for removing blend chains as claimed in claim 13, wherein said solving each said loop problem further comprises:
    selecting a start external edge from said set of said external edges;
    finding an opposite face or opposite edge for the selected start external edge using geometric heuristics; and
    creating two new edges to produce resultant edges when an opposite face is found or joining the two edges to produce resultant edges when an opposite edge is found, and determining the convexity of the resultant edges using at least one geometric heuristic; and
    splitting said loop problem into two loop sub-problems, each said loop sub-problem comprising a fewer number of external edges than said loop problem;
    solving recursively the two sub-problems until a final solution graph is obtained and
    performing a validity check on the final solution graph to determine whether the corresponding solution is geometrically feasible.

15. A method for removing blend chains as claimed in claim 14, further comprising backtracking in order to obtain a valid solution in case of failure of a said geometric heuristic used in determining the opposite face or edge or in said determining the convexity of the resultant edges.

16. A method for removing blend chains as claimed in claim 15, wherein said backtracking further comprises undoing a said loop problem and trying all possible opposite faces and edges and all possible convexities for the resultant edges in attempting to obtain a valid solution.

17. A method for removing blend chains as claimed in claim 16, further comprising deleting the all resultant edges, vertices and faces formed during solving of the loop problem so as to try another possible solution graph for the loop problem.

18. A computer-readable medium comprising computer-readable instructions which, when executed using a computer, perform the steps of claim 12.

* * * * *